United States Patent [19]
LeBlanc et al.

[11] Patent Number: 5,736,116
[45] Date of Patent: Apr. 7, 1998

[54] AMMONIA PRODUCTION WITH ENRICHED AIR REFORMING AND NITROGEN INJECTION INTO THE SYNTHESIS LOOP

[75] Inventors: Joseph Ray LeBlanc, Fulshear; Stan A. Knez, Houston, both of Tex.

[73] Assignee: The M. W. Kellogg Company, Houston, Tex.

[21] Appl. No.: 547,853

[22] Filed: Oct. 25, 1995

[51] Int. Cl.$^6$ ................................................ C01C 1/04
[52] U.S. Cl. ........................................ 423/359; 423/362
[58] Field of Search ................................ 423/359, 362

[56] References Cited

U.S. PATENT DOCUMENTS

| | | | |
|---|---|---|---|
| 4,055,628 | 10/1977 | McCarroll et al. | 423/448 |
| 4,122,040 | 10/1978 | McCarroll et al. | 252/447 |
| 4,163,775 | 8/1979 | Foster et al. | 423/363 |
| 4,230,669 | 10/1980 | Eagle et al. | 422/148 |
| 4,568,530 | 2/1986 | Mandelik et al. | 423/359 |
| 4,568,531 | 2/1986 | van Dijk et al. | 423/361 |
| 4,568,532 | 2/1986 | Benner et al. | 423/361 |
| 4,681,745 | 7/1987 | Pinto | 423/359 |
| 4,696,799 | 9/1987 | Noe | 422/148 |
| 4,735,780 | 4/1988 | Noe | 422/148 |
| 4,886,651 | 12/1989 | Patel et al. | 423/359 |
| 5,011,625 | 4/1991 | LeBlanc | 252/376 |
| 5,180,570 | 1/1993 | Lee et al. | 423/359 |
| 5,250,270 | 10/1993 | Noe | 422/192 |

*Primary Examiner*—Wayne Langel
*Attorney, Agent, or Firm*—John P. Ward

[57] ABSTRACT

A retrofit method for increasing production capacity of an ammonia plant having a front end including in series primary and secondary reformers and a shift converter for reacting a hydrocarbon feed, steam and air to form a make-up syngas stream comprising hydrogen and nitrogen at about design stoichiometry, and a synthesis loop wherein a recycle syngas stream is combined with the make-up gas to form a syngas feed to ammonia converters. The retrofit involves the installation of an air separation unit to supply oxygen and nitrogen streams. The oxygen is used to enrich air supplied to the secondary reformer and increase the hydrogen content of the make-up gas substantially above the design stoichiometry and capacity. The nitrogen stream is supplied to the synthesis loop to obtain a desired hydrogen to nitrogen ratio in the syngas feed to the ammonia converters and compensate for the excess hydrogen in the make-up gas. The synthesis loop, if desired, is upgraded to include a high activity catalyst converter for increased ammonia production.

15 Claims, 2 Drawing Sheets

AMMONIA PRODUCTION WITH ENRICHED AIR REFORMING AND NITROGEN INJECTION INTO THE SYNTHESIS LOOP

FIELD OF THE INVENTION

The present invention is directed to a process for the manufacture of ammonia using enriched air reforming and injection of nitrogen into the synthesis loop, and more particularly to a retrofit method for increasing the production capacity of an ammonia plant by installing air enrichment and nitrogen injection capabilities.

BACKGROUND OF THE INVENTION

Many plants have been built for producing ammonia. Typically, a hydrocarbon feedstock such as natural gas is reformed in a front end of the plant to produce a synthesis gas containing hydrogen and nitrogen. The synthesis gas is then converted in a synthesis loop to form ammonia. Many plants operate with a synthesis loop based on magnetite catalyst in the ammonia synthesis converters. These reactors generally operate with a hydrogen to nitrogen ratio (HN ratio) in the feed of about 3. More recently, plants have been built using a more efficient catalyst which is based on a platinum group metal such as ruthenium supported on a graphite-containing carbon as in, for example, U.S. Pat. No. 4,568,530 which is hereby incorporated herein by reference. Using the ruthenium catalyst, the HN ratio is desirably less than 3.

Technological advances have also been made in the front end of the ammonia plant for making the synthesis gas. Conventionally, plants were built with primary and secondary reformers. In the primary reformer, steam and natural gas is reacted at an elevated temperature in a fired furnace. In the secondary reformer, air is added to the effluent from the primary reformer and the mixture reacted adiabatically using the combustion reaction with oxygen in the air as a source of heat for the reforming reaction. The effluent from the secondary reformer is then shift converted to favor the formation of hydrogen. A significant change in more recent plants has been the use of autothermal steam reforming wherein the effluent from the secondary or autothermal reformer is used as the primary source of heat for the primary reformer (or more accurately a reforming exchanger), as in for example, U.S. Pat. No. 5,011,625 which is hereby incorporated herein by reference. In either case, the HN ratio is controlled by controlling the amount of nitrogen injected with the air to the secondary or autothermal reformer. In some instances, oxygen-enriched air has also been supplied to the secondary or autothermal reformer as an economic tradeoff between the cost of the oxygen unit and the benefits of using oxygen-enriched air in the secondary/autothermal reformer feed.

Frequently, it is desired to increase the capacity of an existing ammonia plant. The production capacity of the synthesis loop can usually be relatively easily increased by installing high activity ruthenium catalyst converter capability and/or modifying the synthesis gas compressor to handle additional synthesis gas. Increasing the capacity of the front end has been more problematic. Even though the primary and secondary reformers may have additional capacity, or can be easily modified to increase capacity, the air compressor, shift converters and/or $CO_2$ removal system are usually already constrained at maximum capacity. Increased capacity in the front end of the plant can require the installation of parallel equipment such as another air compressor and additional $CO_2$ removal equipment, a costly option. Thus, a need exists for a retrofit capable of increasing the capacity of an ammonia plant without installing parallel equipment.

SUMMARY OF THE INVENTION

The present invention is an ammonia plant which uses enriched air reforming coupled with strategic injection of nitrogen into the synthesis loop. An oxygen-rich stream is injected into a secondary or autothermal reformer of an ammonia plant to facilitate reforming of natural gas or other reformable hydrocarbon feed. A nitrogen-rich stream is injected into the make-up gas or ammonia synthesis loop. This strategic mixing point of the nitrogen has the advantage of bypassing the conventional processing of excess nitrogen in the front end of the ammonia plant, and providing the nitrogen required for the ammonia conversion. By injecting the nitrogen into the make-up gas or synthesis loop, the nitrogen bypasses the front end which results in a lower front end pressure drop than would otherwise result and reduces equipment costs. The invention is particularly applicable to the retrofit of an existing plant, where this process can eliminate significant constraints to higher production capacity in the front end of the ammonia plant. The strategic mixing of nitrogen in the make-up gas or synthesis loop provides flexibility of operation, hydrogen-to-nitrogen ratio (HN ratio) control and maximizes the performance of ammonia synthesis catalyst. This process is applicable to conventional magnetite catalyst systems, as well as catalyst systems based on a platinum group metal on a graphite-containing carbon support.

Broadly, this invention provides a process for ammonia synthesis which includes the steps of: (a) separating air into oxygen-rich and nitrogen-rich streams; (b) mixing air with the oxygen-rich stream from step (a) to form an oxygen enriched stream containing 25 to 40 mole percent oxygen; (c) injecting the oxygen-enriched stream from step (b) into an autothermal reformer of a syngas unit including a primary reformer upstream from the autothermal reformer and a downstream shift converter, $CO_2$ removal unit and methanator, to produce a syngas stream; and (d) supplying the syngas stream from step (c) and the nitrogen-rich stream from step (a) as make-up gas to an ammonia synthesis loop. In a step (e), the ammonia synthesis loop is operated to (1) convert nitrogen and hydrogen in an ammonia synthesis reactor feed stream to form an ammonia-rich stream, (2) recover ammonia from the ammonia-rich stream to form a recycle gas stream, (3) remove a purge stream from the synthesis loop, (4) recover a hydrogen-rich gas from the purge stream, and (5) combine the hydrogen-rich gas with the recycle stream and the make-up gas from step (d) to form the ammonia synthesis reactor feed stream.

In another aspect, the invention provides a retrofit method for increasing the production capacity of an ammonia plant having a front end including in series primary and secondary reformers and a shift converter for reacting a hydrocarbon feed, steam and air to form a make-up syngas stream comprising hydrogen and nitrogen at about design stoichiometry, and a synthesis loop wherein a recycle syngas stream is combined with a make-up gas to form a syngas feed to ammonia converters. The method includes enriching air supplied to the secondary reformer with oxygen and increasing hydrogen content of the make-up gas substantially above the design stoichiometry. As a second step, a substantially pure nitrogen stream is supplied to the synthesis loop to obtain a desired hydrogen to nitrogen ratio in the syngas feed to the ammonia converters.

The retrofit can include installing an air separation unit to form oxygen-rich and nitrogen-rich streams, wherein the oxygen-rich stream is added to air in the enrichment step, and wherein the nitrogen-rich stream is used as a source for the substantially pure nitrogen stream. Preferably, the existing synthesis loop capacity of the ammonia plant, prior to the retrofit, exceeds the existing front end capacity. In this manner, the front end capacity of the plant is increased by the retrofit to meet some or all of the excess capacity of the synthesis loop. Alternatively, the synthesis loop can be modified to increase the capacity to exceed the capacity of the front end existing before the retrofit. In this manner, the overall capacity of the ammonia plant can be increased.

When the ammonia plant includes a methanator for removing carbon oxides to condition the make-up syngas stream for the synthesis loop, the nitrogen supply step preferably comprises injecting a nitrogen stream into the make-up syngas stream upstream from the methanator. Any oxygen compounds in the nitrogen stream are removed in the methanator.

In another embodiment, the nitrogen stream is essentially free of oxygen and oxygen compounds and can be added directly to the make-up syngas stream, or into the syngas feed, depending on the capacity of the existing make-up gas compressor to handle the additional nitrogen. Where the make-up syngas compressor cannot handle the additional nitrogen stream, the nitrogen stream can be compressed with a separate compressor and injected into the syngas feed.

In a preferred embodiment, the present invention provides a retrofit method for increasing the production of an ammonia plant having (1) a front end including a primary reformer, a secondary reformer, an air compressor, and a $CO_2$ removal unit for reacting a hydrocarbon feed stream with steam and compressed air to produce a make-up syngas stream having a design HN ratio at a preexisting capacity, and (2) a synthesis loop wherein a recycle syngas stream is combined with the make-up syngas stream to form a syngas feed to ammonia converters for producing ammonia at a preexisting capacity. The retrofit method includes the steps of: installing an air separation unit to produce oxygen-rich and nitrogen-rich streams; injecting the oxygen-rich stream into the compressed air and operating the front end at an increased capacity relative to its preexisting capacity wherein a raw syngas stream from the $CO_2$ removal unit has an increased HN ratio relative to the design ratio; supplying the nitrogen-rich stream to the synthesis loop; and modifying the synthesis loop to increase the ammonia capacity of the synthesis loop. The injection step preferably forms an oxygen-enriched air stream for feed to the secondary reformer containing from 25 to 40 volume percent oxygen. The oxygen-rich stream which is used to enrich the air stream preferably contains from 40 to 100 volume percent oxygen. The nitrogen-rich stream preferably contains less than 1 volume percent oxygen, is injected into the raw syngas stream, and the retrofit method preferably includes passing the nitrogen-enriched raw syngas stream through a methanator to form the make-up syngas stream essentially free of oxygen and oxygen-containing compounds. Alternatively, the nitrogen-rich stream is essentially free of oxygen and the nitrogen rich stream is injected into the makeup syngas stream downstream from a methanator. As another alternative where the nitrogen-rich stream is essentially free of oxygen, the nitrogen-rich stream is injected into the syngas feed to the ammonia converters. The modification of the synthesis loop can include the installation of ammonia conversion capacity based on high activity catalyst comprising a platinum group metal supported on graphite-containing carbon.

DETAILED DESCRIPTION OF THE INVENTION

Figure 1:
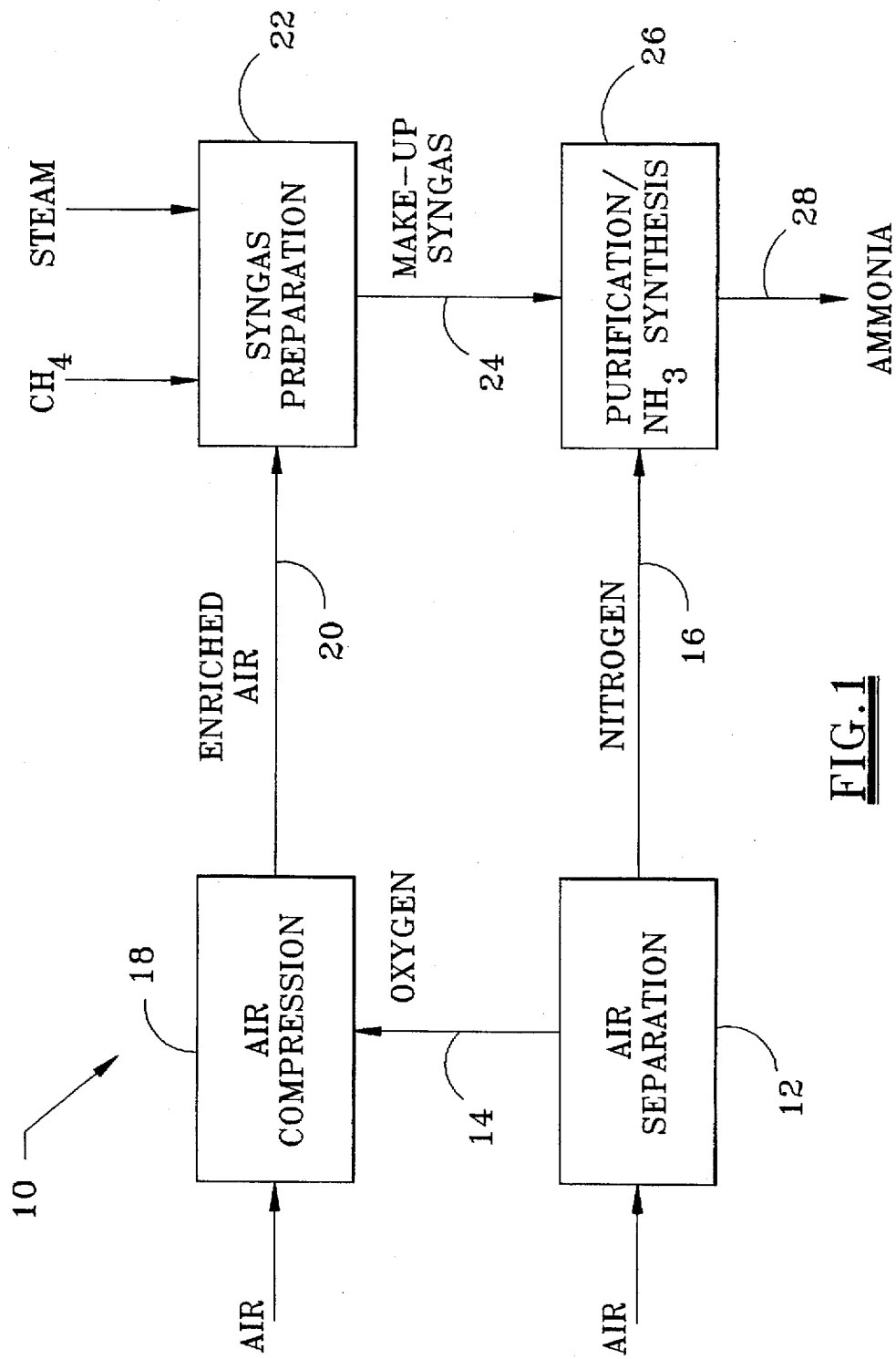
FIG. 1 is a schematic illustration of an enriched air/nitrogen injection of ammonia process according the present invention which includes an air separation unit.

In the ammonia production scheme of the present invention, oxygen-enriched air is supplied to the secondary reformer in the front end of the plant to increase hydrogen production, and nitrogen is added downstream to maintain the desired stoichiometry for the ammonia synthesis. With reference to FIG. 1, the ammonia process 10 includes an air separation step 12 in which air is separated into oxygen-rich and nitrogen-rich streams 14 and 16. The oxygen-rich stream 14 is supplied to an air compression step 18 to produce an oxygen-enriched air stream 20. The enriched air stream 20 is supplied to a synthesis gas preparation step 22 in which a hydrocarbon feed such as natural gas is reformed with steam using the oxygen-enriched air stream 20 for secondary reforming. The syngas preparation step 22 yields a raw make-up syngas stream 24. The raw make-up syngas stream 24 is relatively lean in nitrogen, and the additional nitrogen required is supplied by nitrogen-rich stream 16 to the synthesis gas purification/ammonia synthesis step 26 to yield an ammonia product stream 28.

The air separation step 12 is effected using conventional techniques for separating air into nitrogen-rich and oxygen-rich streams, such as, for example, cryogenic distillation, pressure-swing absorption or the like. Typically, cryogenic distillation is preferred for economic reasons. Air separation can be avoided if oxygen-rich and nitrogen-rich streams of suitable purity and quantity are otherwise available.

When cryogenic distillation is used to separate air into oxygen and nitrogen streams, the purity of the oxygen-rich stream is not critical since it will be used in the air compression step 18 to supply the enriched air stream 20 to the syngas preparation step 22. Oxygen streams containing as little as 40 volume percent oxygen up to 100 volume percent oxygen of high purity are suitable, but it is preferable to use an oxygen-rich stream 14 with an oxygen content of from 50 to 80 volume percent in sufficient quantities to produce an enriched air stream 20 containing from 25 to 40 volume percent oxygen, more preferably from about 26 to about 36 volume percent oxygen. Depending on how the nitrogen-rich stream 16 is injected into the purification/synthesis step 26, the purity thereof, particularly the content of oxygen and oxygen-containing compounds, is generally an important consideration. Since the nitrogen-rich stream 16 is not processed in the reforming reactions which would normally remove oxygen, care must be taken to avoid the deleterious effects that oxygen in the nitrogen-rich stream 16 could otherwise have on the catalyst used in the synthesis step 26 for ammonia conversion. Preferably, the nitrogen-rich stream has a low oxygen content to facilitate purification of the nitrogen-rich stream 16. Less than 1 volume percent oxygen in the nitrogen-rich stream 16 is preferred, and oxygen contents below 1,000 ppmv are particularly advantageous, especially below 5 ppmv. In one preferred arrangement, the air separation 12 involves the cryogenic fractionation of air in a configuration typically employed in the air separation arts for the production of high purity nitrogen essentially free of oxygen, and a reject oxygen product containing 50–80 volume percent oxygen.

The equipment and techniques used for compressing air in the air compression step 18 are well known in the art. The enriched oxygen stream 14 can be introduced at an ambient air intake for a conventional air compressor, or it can be introduced between stages of the compressor. Frequently, the air compression step 18 in existing plants is near maximum of the capacity of the air compression equipment. Thus, introducing the oxygen-rich stream 14 means that less ambient air is used in the compression step 18 as this is replaced by the oxygen-rich stream 14.

The syngas preparation step 22 is performed using conventional equipment designed for this purpose. Typically, the syngas preparation step 22 will involve the operation of a primary reformer, a secondary reformer and high and low temperature shift converters. The primary reformer typically heats natural gas and steam to partially reform the natural gas. This is usually done in a fired furnace, but as used herein the term "primary reformer" generically encompasses the so-called reforming exchanger as well. The partially reformed effluent from the primary reformer is then mixed with the enriched air stream 20 and reacted adiabatically to complete the reforming reaction. In some ammonia plants, a so-called autothermal reformer is used to adiabatically react the air and effluent from the primary reformer and supply heat to the primary reformer (reforming exchanger). As used herein, the term "secondary reformer," and terms of similar import, are used generically to include the autothermal reformer, even though most of the natural gas may actually be reformed in the autothermal reformer. Carbon monoxide in the effluent from the secondary reformer is typically converted according to the shift reaction with steam to form carbon dioxide and additional hydrogen. The effluent from the secondary reformer, or the shift converters, and/or $CO_2$ removal equipment, if employed, forms the make-up syngas stream 24.

The performance of the syngas preparation step 22 according to the present invention results in the formation of a generally hydrogen-rich, nitrogen-lean make-up syngas stream 24. Although the volume of the oxygen-enriched air stream 20 is similar to the volume of compressed air supplied without the enrichment, the presence of the additional oxygen allows the reforming of more hydrocarbon in the secondary reformer. The processing of more natural gas results in the formation of more hydrogen, but less nitrogen is introduced into the secondary reformer when the oxygen-enriched air stream 20 is employed. To produce the same quantity of hydrogen at the same H/N ratio prior to the use of enriched air would result in a substantially higher volume of gas being processed in the reformers and shift converters; however, in the present invention, the volume of gas processed in the reformers, shift converters and $CO_2$ removal equipment is not substantially higher. Thus, more hydrogen can be produced with a relatively low increase of pressure losses through the reformers and shift converters. On the other hand, the additional oxygen in the enriched air stream 20 relative to compressed air can result in more heat being produced in the effluent from the secondary reformer. This can advantageously produce additional steam from the heat recovery section typically found downstream from the secondary reformer and shift converters.

Figure 2:
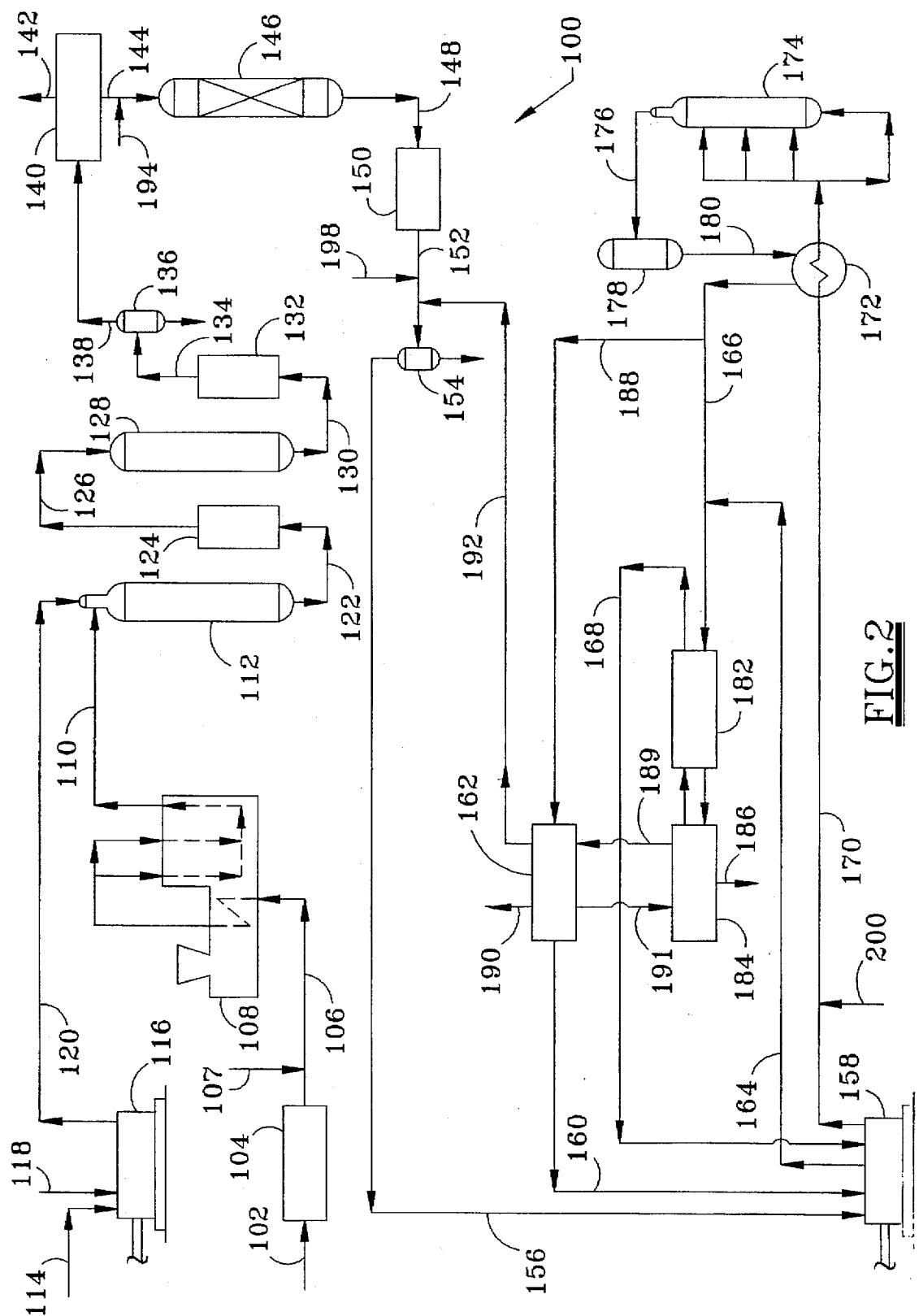
FIG. 2 is a schematic process flow diagram for a retrofit ammonia plant according to one embodiment of the present invention.

An example of an ammonia plant 100 using conventional primary and secondary reforming and a magnetite ammonia reactor retrofitted for secondary reforming with enriched air, downstream nitrogen injection, and operation of a high activity ammonia converter in series with the magnetite converter, is shown in FIG. 2. A reformable hydrocarbon feedstock such as natural gas is supplied via line 102 to desulfurizer 104 for removal of sulfur, for example, by adsorption on activated carbon, by reaction with zinc oxide to remove $H_2S$, mercaptans and chlorine, or another sulfur removal technique known in the art. The desulfurized feedstock is obtained from the desulfurizer in line 106 into which is introduced steam via line 107 for reforming in primary reformer 108. The primary reformer 108 is conventionally fired and produces a partially reformed effluent in line 110. The effluent in line 110 is fed to secondary reformer 112. Air is supplied via line 114 to compressor 116 along with an oxygen-rich stream 118 to form an oxygen-enriched compressed air stream 120 which is also added to the secondary reformer 112 for reaction with the partially reformed feedstock from line 110. The effluent from the secondary reformer 112 is passed via line 122 to conventional heat recovery section 124 and then via line 126 to shift converter 128. The shift converter 128 can include high and low temperature shift converters in series which are conventional in the art for reacting carbon monoxide and steam to form hydrogen and carbon dioxide.

The effluent from the shift converter 128 is passed via line 130 to carbon dioxide removal system 132. The carbon dioxide removal system can be any one of the $CO_2$ removal systems well known in the art, such as, for example, a monoethanolamine solvent system, promoted monoethanolamine solvent system, a methyldiethanolamine solvent system, a Vetrocoke system, a Carsol system, a Catacarb system, a Benfield system, a Lurgi system, a Sulfinol system, a triethanolamine-monoethanolamine system, a Purisol system, a Rectisol system, a Fluor solvent system, a Selexol system, or the like. A $CO_2$ stream is recovered via line 142 and a $CO_2$-lean stream 144 is fed to methanator 146 for conventional conversion of residual carbon monoxide and carbon dioxide to form an effluent 148 which is essentially free of oxygen and oxygen compounds. Sometimes cryogenic purification is used in place of the methanator 146. After conventional heat recovery in heat recovery unit 150, a make-up syngas stream 152 is obtained.

The make-up syngas in stream 152 is passed through knockout drum 154 and supplied via line 156 to two-case synthesis gas compressor 158. The compressor 158 compresses the make-up syngas from line 156 and a hydrogen recycle stream 160 from hydrogen recovery unit 162 to a suitably high pressure in line 164 for injection into cooled reactor effluent line 166. A syngas feed stream 168 is supplied to the second case of the compressor 158, discharged in line 170, heated in cross-exchanger 172 and fed to ammonia converter 174. The converter 174 is a conventional reactor based on magnetite catalyst which converts hydrogen and nitrogen in the synthesis gas to ammonia. Effluent from the converter 174 is supplied via line 176 to reactor 178 based on high activity platinum group metal catalyst supported on graphite-containing carbon. The effluent 180 from the reactor 170 thus contains more ammonia than the effluent in line 176.

The ammonia is recovered by cooling the effluent 180 in the cross-exchanger 172, passing the cooled effluent via line 166 for condensation in unitized exchanger/refrigeration unit 182, and separation of the ammonia in separation unit 184 to obtain an ammonia product stream 186 and the syngas feed stream 168. The syngas feed stream 168 is supplied to the compressor 158. A portion of the cooled reactor effluent as mentioned previously, is removed from line 166 via line 188 and fed to hydrogen recovery unit 162. A low pressure flash gas stream 189 can be supplied from the ammonia separation unit 184. The hydrogen recovery unit 162 produces hydrogen-enriched stream 160 for recycle to the ammonia conversion reactors 174 and 178. A purge stream generally suitable for use as fuel gas is obtained via line 190. Ammonia recovered from the hydrogen recovery unit 162 is returned to the ammonia separation unit 184 via line 191. Additional product stream(s) from the hydrogen recovery unit 162 can include a low pressure hydrogen-rich stream taken off via line 192 which can, if desired, be returned into line 152.

Additional nitrogen is supplied to the synthesis reactors 174 and 178 by strategically injecting nitrogen into one or more lines in the process 100. The particular location of the nitrogen injection depends on the pressure and purity of the nitrogen stream, and the particular configuration and capacity of the equipment in the process 100. For example, where the nitrogen stream contains or may contain some oxygen, it is injected via line 194 into line 144 upstream of the methanator 146. Where the available nitrogen is relatively pure, it can be injected via line 198 into the make-up syngas stream 152. Where the nitrogen is of high purity and pressure, it can be injected via line 200 into the synthesis loop, for example, in the feed stream 170 or another desirable location.

EXAMPLE

The principles of the present invention are used to retrofit an existing ammonia plant. As originally built, the ammonia plant used zinc oxide desulfurization of a natural gas feedstock; a primary reformer operating at 35.15 kg/cm$^2$; convection heating to preheat the process air to the secondary reformer, to preheat the natural gas/steam feed, to provide high pressure (102 kg/cm$^2$(g)) steam generation, to provide high pressure steam superheat, to provide heat for low pressure (3.5 kg/cm$^2$(g)) steam generation, to heat natural gas feed prior to desulfurization and to heat fuel gas; an auxiliary boiler supplementing high pressure steam production; a steam-to-carbon ratio of 3.5; an overall furnace efficiency of 85 percent; a potassium carbonate-based low heat $CO_2$ removal system featuring 4-stage flashing of semi-lean solution and a hydraulic turbine for power recovery from the rich solution; ammonia synthesis at 212.3 kg/cm$^2$ pressure; synthesis gas make-up combined with converter effluent; a 3-bed ammonia converter with interbed quenching; steam-driven air compressor, synthesis gas compressor and refrigeration compressor; a low pressure process condensate stripper; and a location of the plant adjacent to a urea plant with some integration of offsites. The plant had previously been retrofitted to incorporate the following features: a converter basket retrofit using a radial flow 3-bed/quench intercooled design; lowering the synthesis loop operating pressure to 168 kg/cm$^2$(g); installation of a cryogenic hydrogen recovery unit to process high pressure purge and ammonia plant flash gases which reduced the inerts level in the synthesis from 13.6 percent to 10 percent. The plant has an ammonia production capacity 111 percent of the original plant design prior to retrofit according to FIG. 2 of this invention. A simplified material balance of the existing plant is shown in Table 1.

[see Table 1 on next page]

TABLE 1

| Stream | Feed to Primary Reformer | Primary Reformer Effluent | Air/Steam to Secondary Reformer | Secondary Reformer Effluent | CO2 Absorber Inlet | CO2 Absorber Outlet |
|---|---|---|---|---|---|---|
| Components (kg-mole/hour) | | | | | | |
| H2 | 67.7 | 4277.6 | — | 5358.3 | 6568.1 | 6558.3 |
| N2 | 9.9 | 9.9 | 2190.8 | 2200.8 | 2200.5 | 2197.2 |
| CH4 | 1516.1 | 769.6 | — | 39.7 | 39.7 | 39.6 |
| Ar | 1.2 | 1.2 | 26.4 | 27.5 | 27.5 | 27.5 |
| NH3 | — | — | — | — | — | — |
| H2O | 7187.3 | 5210.8 | 152.0 | 4741.9 | 208.4 | 88.2 |
| CO | — | 579.9 | — | 1240.1 | 29.3 | 29.2 |
| CO2 | 50.0 | 748.3 | 0.9 | 818.8 | 2024.6 | 17.7 |
| O2 | — | — | 589.3 | — | — | — |
| C2-C6 | 208.7 | — | — | — | — | — |
| Total Flow (kg-mole/hour) | 9040.9 | 11597.3 | 2959.3 | 15427.1 | 11098.2 | 8957.9 |
| Temp (°C.) | 400 | 819 | 173 | 974 | 85 | 68 |
| Press (kg/cm2(a)) | 43.0 | 34.4 | 38.9 | 33.8 | 30.0 | 29.6 |

| Stream | Purified Make-up Gas | Hydrogen Recovery | Converter Feed | Converter Effluent | Purge Gas | Ammonia Product |
|---|---|---|---|---|---|---|
| Components (kg-mole/hour) | | | | | | |
| H2 | 6345.1 | 356.7 | 20184.0 | 14073.0 | 482.0 | — |
| N2 | 2178.5 | 48.7 | 6512.5 | 4475.6 | 153.3 | — |
| CH4 | 85.9 | 4.3 | 2436.9 | 2436.9 | 83.5 | — |
| Ar | 27.3 | 6.2 | 930.8 | 930.8 | 31.9 | — |
| NH3 | — | — | 551.2 | 4625.1 | 158.4 | 4063.8 |
| H2O | 23.4 | — | — | — | — | — |
| CO | — | — | — | — | — | — |
| CO2 | — | — | — | — | — | — |
| O2 | — | — | — | — | — | — |
| C2-C6 | — | — | — | — | — | — |
| Total Flow (kg-mole/hour) | 8660.2 | 415.9 | 30615.5 | 26541.4 | 818.3 | 4063.8 |
| Temp (°C.) | 39 | 28 | 132 | 354 | 56 | 8 |
| Press (kg/cm2(a)) | 28.0 | 55.0 | 175.0 | 171.0 | 169.2 | 1.0 |

The ammonia plant is retrofitted according to FIG. 2 to increase production capacity by installing an air separation unit to supply oxygen in line 118 for enriched air reforming and nitrogen in line 198 for the synthesis loop; installing a nitrogen compressor (not shown) to supply the nitrogen at the suction pressure of the synthesis gas compressor; installing a high activity catalyst reactor 178 in the synthesis loop downstream from the magnetite reactor 174 to increase ammonia conversion; and making various other modifications to facilitate the retrofit and upgrade the overall performance of the plant.

The air separation unit is installed as shown in FIG. 1 to operate the front end of the ammonia plant with enriched air reforming, and injection of high purity nitrogen using a new nitrogen compressor which directs the nitrogen to the suction of the synthesis gas compressor. A higher production capacity can be reached without having to parallel any major equipment areas, such as, for example the air compressor or the $CO_2$ removal system, which would add dramatically to the cost of a comparable increase in production capacity. Bypassing a portion of the nitrogen also has the result of lowering the front end pressure drop which would have been a significant constraint to reaching a comparable production capacity with a more conventional, parallel system installation approach.

The air separation unit produces the high purity oxygen stream 118 which is mixed with the ambient air compressed in the existing air compressor 116. A new parallel air compressor is therefore not required. The enriched air stream 120, containing about 26 to 36 percent oxygen is directed to the secondary reformer 112. The secondary reformer inlet can be modified to allow for a mixing of the enriched air/steam and primary reformer effluent stream to facilitate combustion without the addition of a mechanical burner. The air separation unit is designed such that a stream of high purity (less than 5 ppmv oxygen) nitrogen 198 is available at a sufficient quantity to supply the requisite nitrogen for the ammonia reaction, at the desired HN ratio. Nitrogen stream 198 is compressed in a stand-alone nitrogen compressor (not shown) and mixed with the make-up gas at the suction to the synthesis gas compressor 158. The nitrogen compressor is either motor or steam driven, depending upon the available steam and the steam distribution requirements of the modified plant.

In connection with the retrofit, the reforming catalyst is replaced with new catalyst, as a routine maintenance item, with the result that hydrogen recycle to the primary reformer to enhance catalyst performance is avoided. Also, the tubes in the primary reformer 108 are replaced since they are old and due for replacement, as another routine maintenance item. The new tubes have an upgraded metallurgy which allows the same tube outside diameter to be maintained at a larger inside diameter. In the convection section of the primary reformer 108, a low temperature feed preheat coil is added. Other convection section modifications can be made, depending on the steam/boiler feed water requirements of the retrofitted plant. The complete convection section and existing burners are also analyzed to determine additional modifications which are required or feasible to achieve an increase in overall burner efficiency to around 85–86 percent, about 3 percent higher than the furnace efficiency prior to retrofit. Combustion air preheat is not specified in that the incremental energy savings that result do not offer a reasonable return on investment. In addition, the induced draft fan is replaced or modified to increase its maximum capacity.

The $CO_2$ removal system 140 is upgraded in accordance with licensor recommendations to replace the old packing in the $CO_2$ absorber and the $CO_2$ stripper with a high efficiency packing, and to incorporate an activator in the potassium carbonate solution to achieve a maximum $CO_2$ slip of 1,000 ppmv and a $CO_2$ product purity minimum of 99 percent. In addition, the heat exchangers in the $CO_2$ removal system are closely scrutinized to determine if they are adequate.

In the retrofit plant, the make-up gas mass flow to the synthesis gas compressor in line 156 is increased by about 40 percent over themass flow prior to retrofit. To compress this significantly large quantity of gas with the existing synthesis gas compressor 158, the existing compressor internals are modified in accordance with the manufacturers recommendations. Two suction chillers (not shown) are installed to provide syngas cooling to around 7° C. at each of the stage 1 and stage 2 suctions. Because of the increased front-end pressure drop for the retrofit operation, the suction pressure of the synthesis gas compressor 158 is also lower than prior to the retrofit. In addition, the steam turbine drive for the synthesis gas compressor 158 is modified to supply the required power for the additional compression requirements.

To increase the capacity of the ammonia synthesis loop, a high activity catalyst (ruthenium on carbon) converter 178 is added to the synthesis loop in the form of a new 2-bed radial flow reactor and an additional boiler feed water preheater (not shown) for enhanced recovery. The new reactor 178 is installed downstream and in series with the existing magnetite converter 174. The new converter 178 increases ammonia concentration to around 20–22 percent in the effluent stream 180. Energy savings are realized by the higher ammonia conversion in the synthesis loop. The new reactor 178 is designed with two integral intercoolers to provide the necessary preheat requirements.

A new membrane-based hydrogen recovery unit 162 is installed so that the pre-existing cryogenic hydrogen recovery unit, previously shared with another ammonia plant, can be dedicated for operation with another ammonia plant. The new hydrogen recovery unit produces a low pressure hydrogen recycle supplied to the suction of the first stage of the syngas compressor, and a high pressure hydrogen recycle supplied to the suction of the second stage of the syngas compressor.

Some miscellaneous minor additional modifications are required as the retrofit is made. All existing pumps, surface condenser pumps, and $CO_2$ solution pumps are observed closely to determine whether or not they need to be modified and/or replaced to handle any additional flows. Additional offsites and utility supplies are also increased for the retrofit plant as required.

A simplified mass balance for the retrofit plant is presented in Table 2. The data in Table 2 show that the retrofit achieves an ammonia production increase of about 28 percent, and a corresponding carbon dioxide production increase of about 25 percent.

[see Table 2 on next page]

TABLE 2

| Stream | Feed to Primary Reformer | Primary Reformer Effluent | Air/Steam to Secondary Reformer | Secondary Reformer Effluent | CO2 Absorber Inlet | CO2 Absorber Outlet | Nitrogen |
|---|---|---|---|---|---|---|---|
| Components (kg-mole/hour) | | | | | | | |
| H2 | 23.8 | 5494.2 | — | 6689.1 | 8247.2 | 8164.8 | — |
| N2 | 9.0 | 9.0 | 2019.8 | 2028.8 | 2008.4 | 2008.4 | 837.9 |
| CH4 | 2108.6 | 905.1 | — | 38.2 | 38.2 | 37.8 | — |
| Ar | 0.1 | 0.1 | 24.3 | 24.4 | 24.4 | 24.2 | 17.1 |
| NH3 | — | — | — | — | — | — | — |

TABLE 2-continued

| | | | | | | | |
|---|---|---|---|---|---|---|---|
| H2O | 8571.6 | 611.7 | 16.0 | 7017.3 | 250.3 | 109.9 | — |
| CO | — | 802.6 | — | 1602.3 | 42.9 | 42.5 | — |
| CO2 | 69.5 | 895.0 | 0.8 | 962.9 | 2516.1 | 10.3 | — |
| O2 | — | — | 736.5 | — | — | — | — |
| C2–C6 | 185.3 | — | — | — | — | — | — |
| Total Flow (kg-mole/hour) | 10967.9 | 14223.8 | 2797.4 | 18363.0 | 13147.7 | 10397.9 | 855.0 |
| Temp (°C.) | 392 | 810 | 168 | 1004 | 82 | 68 | 110 |
| Press (kg/cm2(a)) | 43.0 | 35.5 | 40.5 | 35.0 | 29.6 | 29.0 | 27.4 |

| Stream | Low Pressure H2 Recovery | Make-up Gas/Nitrogen | H2 Recycle to Desulfurizers | Converter Feed | Converter Effluent | Purge Gas | Ammonia Product |
|---|---|---|---|---|---|---|---|
| Components (kg-mole/hour) | | | | | | | |
| H2 | 521.0 | 8517.0 | 23.8 | 21183.0 | 13384.0 | 556.5 | — |
| N2 | 22.1 | 2868.2 | 8.0 | 7708.0 | 5108.4 | 212.4 | — |
| CH4 | 9.0 | 99.6 | 0.3 | 2213.7 | 2213.7 | 92.1 | — |
| Ar | 5.1 | 46.4 | 0.1 | 1059.9 | 1059.9 | 44.1 | — |
| NH3 | — | — | — | 589.8 | 5789.0 | 240.7 | 5199.0 |
| H2O | — | 4.9 | — | — | — | — | — |
| CO | — | — | — | — | — | — | — |
| CO2 | — | — | — | — | — | — | — |
| O2 | — | — | — | — | — | — | — |
| C2–C6 | — | — | — | — | — | — | — |
| Total Flow (kg-mole/hour) | 557.2 | 11536.1 | 32.2 | 32754.4 | 27555.0 | 1145.8 | 2199.0 |
| Temp (°C.) | 40 | 7 | 88 | 172 | 401 | 57 | 1 |
| Press (kg/cm2(a)) | 27.4 | 27.2 | 56.0 | 175.0 | 171.0 | 169.5 | 1.0 |

The present invention is illustrated by way of the foregoing description which is intended to be non-limiting since many variations will become apparent to those skilled in the art in view thereof. It is intended that all such variations within the scope and spirit of the appended claims be embraced thereby.

We claim:

1. A retrofit method for increasing the production capacity of an ammonia plant having a front end including in series primary and secondary reformers and high and low temperature shift converters for reacting a hydrocarbon feed, steam and air to form a makeup syngas stream comprising hydrogen and nitrogen at a design stoichiometry of about 3, and a synthesis loop wherein a recycle syngas stream is combined with the makeup gas to form a syngas feed to ammonia converters, comprising the steps of:

enriching air supplied to the secondary reformer to an oxygen content of 25 to 40 volume percent and increasing the hydrogen content of the makeup syngas stream above the design stoichiometry;

supplying a substantially pure nitrogen stream to the synthesis loop to obtain a desired hydrogen to nitrogen ratio in the syngas feed to the ammonia converters.

2. The method of claim 1, including installing an air separation unit to form oxygen-rich and nitrogen-rich streams, wherein the oxygen-rich stream is added to air in the enrichment step, and wherein the nitrogen-rich stream is used as a source for the substantially pure nitrogen stream.

3. The method of claim 2, wherein the existing synthesis loop capacity of the ammonia plant exceeds the existing front end capacity prior to the retrofit.

4. The method of claim 1, further comprising the step of modifying the synthesis loop to increase the capacity of the synthesis loop to exceed the capacity of the front end existing before the retrofit.

5. The method of claim 1, wherein the ammonia plant includes a methanator for removing carbon oxides to condition the makeup syngas stream for the synthesis loop, and the nitrogen supply step comprises injecting a nitrogen stream into the makeup syngas stream upstream from the methanator.

6. The method of claim 1, wherein the nitrogen stream is essentially free of oxygen and oxygen compounds and is added to the makeup syngas stream.

7. The method of claim 1, wherein the nitrogen stream is essentially free of oxygen and oxygen compounds and is injected into the syngas feed.

8. A retrofit method for increasing the production capacity of an ammonia plant having (1) a front end including a primary reformer, a secondary reformer, an air compressor, and a $CO_2$ removal unit for reacting a hydrocarbon feed stream with steam and compressed air to produce a makeup syngas stream having a HN ratio at a pre-existing capacity, and (2) a synthesis loop wherein a recycle syngas stream is combined with the makeup syngas stream to form a syngas feed to ammonia converters for producing ammonia at a pre-existing capacity, comprising the steps of:

installing an air separation unit to produce oxygen-rich and nitrogen-rich streams;

injecting the oxygen-rich stream into the compressed air to form an oxygen enriched stream for feed to the secondary reformer containing from 25 to 40 volume percent oxygen and operating the front end at an increased capacity relative to its pre-existing capacity wherein a raw syngas stream from the $CO_2$ removal unit has an increased HN ratio relative to the ratio at the pre-existing capacity;

supplying the nitrogen-rich stream to the synthesis loop; and modifying the synthesis loop to increase the ammonia production capacity of the synthesis loop.

9. The retrofit method of claim 8, wherein the oxygen-rich stream contains from 40 to 100 volume percent oxygen.

10. The retrofit method of claim 8, wherein the oxygen-rich stream contains from 50 to 80 volume percent oxygen.

11. The retrofit method of claim 8, wherein the nitrogen-rich stream contains less than 1 volume percent oxygen, the nitrogen-rich stream is injected into the raw syngas stream and the method includes passing the nitrogen-enriched raw syngas stream through a methanator to form the makeup syngas stream essentially free of oxygen and oxygen-containing compounds.

12. The retrofit method of claim 10, wherein the nitrogen-rich stream is essentially free of oxygen and the nitrogen-rich stream is injected into the makeup syngas stream downstream from a methanator.

13. The retrofit method of claim 10, wherein the nitrogen-rich stream is essentially free of oxygen and the nitrogen-rich stream is injected into the syngas feed to the ammonia converters.

14. The retrofit method of claim 8, wherein the modification of the synthesis loop includes the installation of ammonia conversion capacity based on high activity catalyst comprising a platinum group metal supported on graphite-containing carbon.

15. A process for ammonia synthesis, comprising the steps of:

(a) separating air into oxygen-rich and nitrogen-rich streams;

(b) mixing air with the oxygen-rich stream from step (a) to form an oxygen-enriched stream containing 25–40 mole percent oxygen;

(c) injecting the oxygen-enriched stream from step (b) into an autothermal reformer of a syngas unit including a primary reformer upstream from the autothermal reformer and a downstream shift converter, $CO_2$ removal unit and methanator, to produce a syngas stream;

(d) supplying the syngas stream from step (c) and the nitrogen-rich stream from step (a) as makeup gas to an ammonia synthesis loop;

(e) operating the ammonia synthesis loop to (1) convert nitrogen and hydrogen in an ammonia synthesis reactor feed stream to form an ammonia-rich stream, (2) recover ammonia from the ammonia rich stream to form a recycle gas stream, (3) remove a purge stream from the synthesis loop, (4) recover a hydrogen-rich gas from the purge stream, and (5) combine the hydrogen-rich gas with the recycle stream and the makeup gas from step (d) to form the ammonia synthesis reactor feed stream.

* * * * *